Dec. 11, 1951     J. A. BERKE     2,578,036
DEVICE FOR FUELING LARGE AIRCRAFT
Filed Feb. 27, 1947     2 SHEETS—SHEET 1
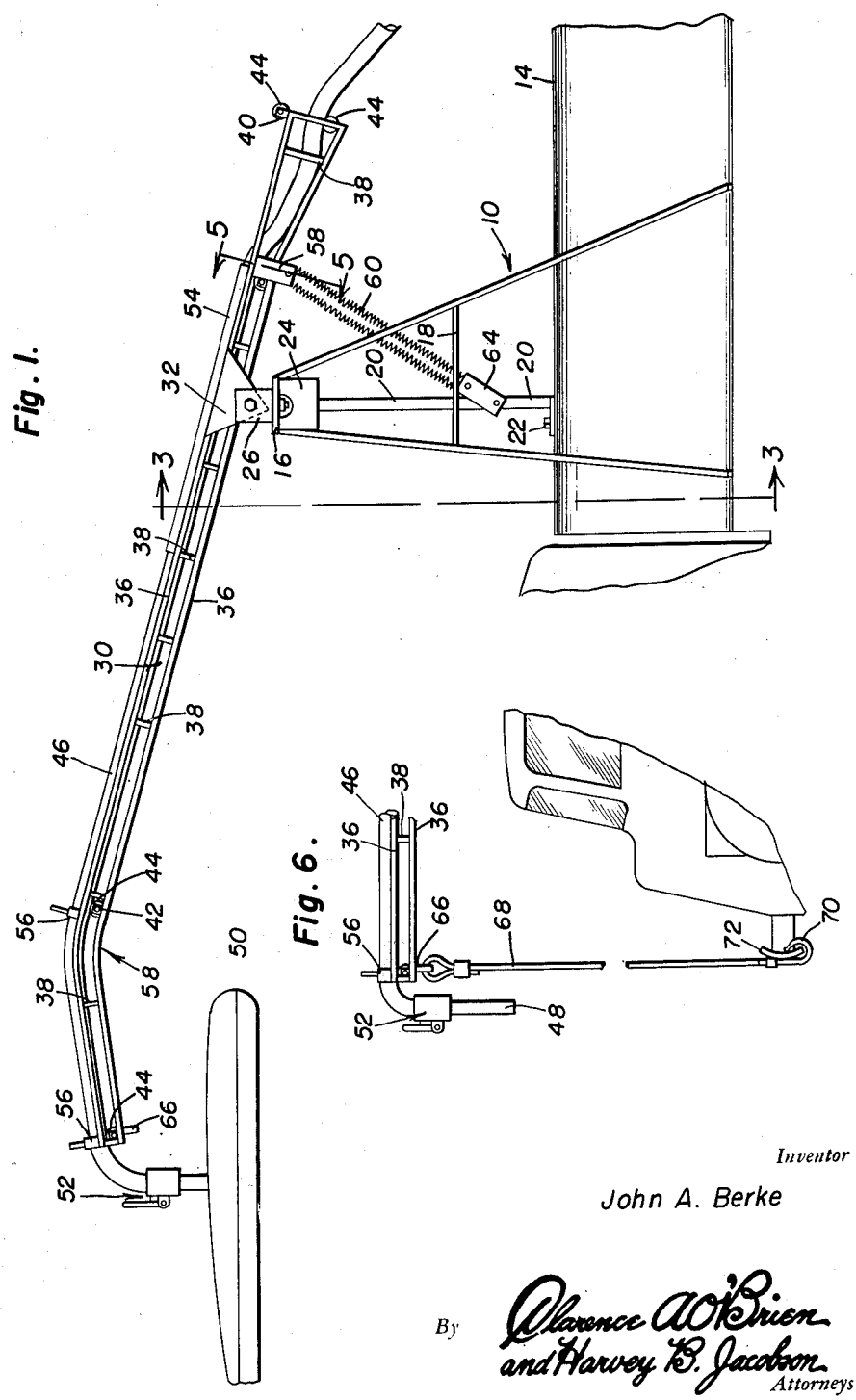
Inventor
John A. Berke
By Clarence A. O'Brien
and Harvey B. Jacobson
Attorneys

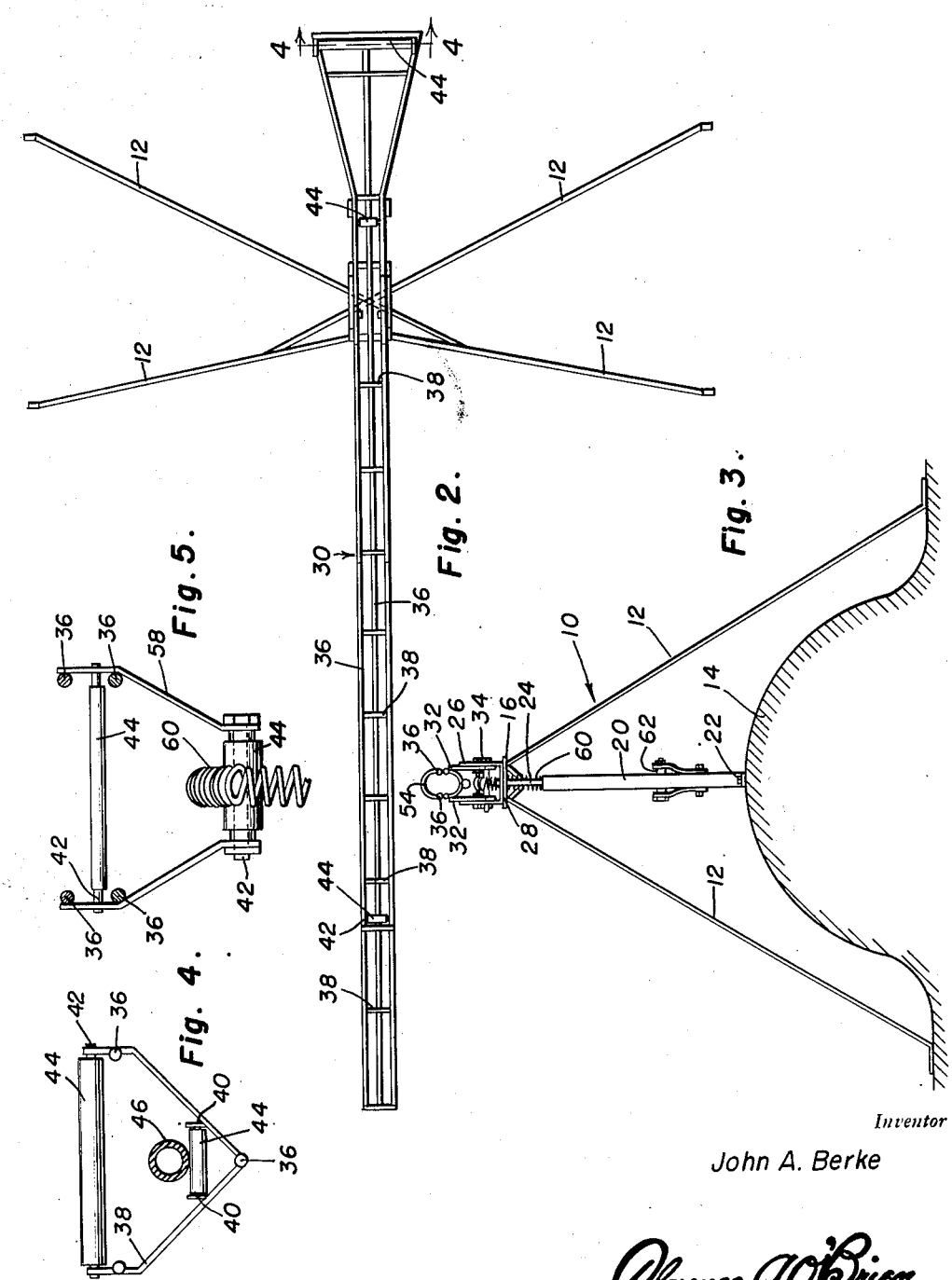

Patented Dec. 11, 1951

2,578,036

UNITED STATES PATENT OFFICE 2,578,036

DEVICE FOR FUELING LARGE AIRCRAFT

John A. Berke, Dallas, Tex.

Application February 27, 1947, Serial No. 731,322

1 Claim. (Cl. 222—536)

This invention relates to improvements in fueling apparatus used in connection with aircraft preferably, large stationary machinery and the like.

An object of this invention is to provide a mechanically simple device including means adaptable to the usual equipment utilized in airfields and the like.

Another object of this invention is to provide boom means pivotally and swivelly secured to said stand.

Another object of this invention is to provide means for resiliently urging said boom in a selected advantageous direction.

A further object of this invention is to provide rolling means for receiving a conduit in said boom.

A still further object of this invention is to provide valve means in said conduit means for selectively controlling the flow therethrough.

Another object of this invention is to provide locking means for securing said boom in a fixed position.

Other objects and features of novelty as well as those pointed out above will become apparent to those skilled in the art, in following the description of the preferred embodiment of the present invention, illustrated in the accompanying drawings, wherein:

Figure 1 is a side elevational view of the preferred form of the present invention;

Figure 2 is a plan view of the invention disclosed in Figure 1, parts being omitted for clarity;

Figure 3 is a transverse sectional view of the invention disclosed in Figure 1 and taken substantially on the line 3—3 thereof and in the direction of the arrows;

Figure 4 is a transverse sectional detail of construction taken substantially on the line 4—4 of Figure 2 and in the direction of the arrows;

Figure 5 is another transverse detail of construction taken substantially on the line 5—5 of Figure 1 and in the direction of the arrows, and Figure 6 is a fragmentary elevational view showing a portion of the boom and conventional front portion of a fueling truck and showing particularly the locking means forming part of the present invention.

Referring now in detail to the illustrated preferred embodiment of the present invention, like reference characters are used throughout to indicate similar parts in the views thereof.

This invention has been conceived and developed to be used primarily in conjunction with the fueling of aircraft, however, the structure of the invention may be utilized in connection with fueling marine elements, stationary equipment and the like. In the preferred embodiment many disadvantages of conventional fueling attachments and systems are obviated by the use of the present invention. Usually, a hose has to be dragged along the ground from a truck through water, snow, dust, etc. and then a rope or ladder has to be pulled up over the wings to the tank filling compartment. By use of the present invention all these disadvantages are obviated. By suspending a hose along the boom the operator does not have the weight of the hose hanging down making it difficult for him to maintain footing on the aircraft in inclement weather. Also, it will be apparent, as the description proceeds, that tearing and damaging of the wing structure and deicer boots caused by scraping the usual hose across them is completely obviated.

A stand, generally indicated by the reference character 10, is comprised of a plurality of legs 12 which are adapted to be received on and secured to the fuel-bearing portion of a truck 14. The truck intended to be used in conjunction with the present invention is a conventional automotive vehicle used extensively at this time in the art. An upper plate 16 is provided at the juncture of said rod 12 and is rigidly fixed thereto. If so desired, suitable braces 18 may be provided for stiffening purposes. A link 20 of relatively heavy construction may be secured to the upper portion of the said truck member 14 by any suitable means such as the conventional bolt 22. The link 20 is provided with a reduced portion 24 at the end thereof and said reduced portion extends to the plate 16.

There is a double swivel connection on said plate 16 and said connection forms an important feature of this invention. By use of this connection universal movement of the boom, to be described hereinafter, is afforded. A substantially U-shaped bracket 26 is rested on said plate 16 by the web 28 thereof and a suitable aperture is provided in said web. As is seen from an inspection of Figure 3, the said aperture receives the pivoted portion 25, thereby affording swiveling motion of the substantially U-shaped member with respect to the stand 10. Any suitable securing means may be used in connection with the holding of the U-shaped bracket 26 on the said pivoted portion 25. A boom, generally indicated by the reference numeral 30, is provided with a pair of fish plates 32 rigidly secured thereto. The said fish plates have aligned apertures received therein. The fish plates 32 are adapted to be received interior of the legs of said U-shaped member 26 and pivotally secured thereto by some suitable pivot means such as the pin 34.

The boom construction mentioned hereinabove is as follows: A plurality of longitudinally extending rods 36 formed into a truss by a plurality of cross rods 38. Perches 40 are suitably secured to selected longitudinal rods 36 as by welding, brazing or the like and have apertures provided therein. Stub shafts 42 are received in said apertures and have rollers 44 rotatably journaled thereon. A plurality of these rollers 44 are provided in said boom 30 and provide an endless conveyor for conduit 46. One end portion of the said conduit 46 is conventionally secured to the fuel outlet of a truck while the opposite terminal portion of the said conduit 46 is provided with a nozzle 48 adapted to be received particularly in the appropriate portion of aircraft 50. A suitable valve means 52 is provided in said conduit adjacent the nozzle 48 for selectively controlling the flow of fuel therethrough. The hose or conduit 46 is confined in said boom 30 by the utility of a semi-cylindrical sleeve member 54 adjacent the said fish plates 32 and by selective use of collars 56, positioned at the terminal portion of the said boom and at any critical point such as the bend 58 therein.

The rearward portion of the said boom 30 is of flared construction and is provided with an upper roller 44 as well as a lower one. This permits of ease in pulling a selected amount of hose through the said boom.

A pair of arms 58 depend from the said boom members 36 and one of the rollers 44 is journaled therein. A resilient biasing means, preferably a coil spring 60 is received around said roller 44 and terminates around a second roller 62 rotatably journaled through the medium of a suitable pair of clips 64 secured to said link 20. The resilient biasing means constantly urges the rearward end of said boom 30 is a predetermined direction. By this medium, an operator standing on a wing section or airfoil 50 may simply pull the boom downward against the action of said spring 60 in fueling aircraft and the like.

A hook 66 depends from the forward end of the said boom 30 and a suitable cable means 68 is secured thereto. Said cable means has an arcuate end portion 70 adapted to engage the conventional bumper 72 of a fueling truck, conventional in this particular art. By this medium, the forward end of the boom 30 may be held in a predetermined fixed position for transportation purposes.

It may be appreciated that the usual fueling truck may be driven beneath a conventional wing 50 and stopped. There is no necessity for maneuvering the said truck in order to position said truck exactly in the required position for fueling aircraft. This is apparent since a universal connection is provided between the stand and the said boom permitting lateral adjustment as well as pivotal. If necessary, more hose may be played out of the said truck.

But a single preferred embodiment of the present invention has been described and illustrated. It is apparent, however, that various changes may be made herein without departing from the spirit of the invention. Accordingly, limitation is sought only in accordance with the scope of the following claim.

Having thus described the instant invention what is claimed as novel and improved is as follows:

An aircraft fueling attachment comprising a stand having means for securing said stand to a fueling truck, a boom, means for swivelly securing said boom to said stand, means for pivotally securing said swivel means to said boom, resilient means for biasing and opposing the operation of said boom, a conduit, rollers secured to said boom for rollingly supporting said conduit in said boom, a valve in said conduit, means disposed at the front end of said boom for locking said boom in a selected position relative to pivotal movement, said swivel securing means including a substantially U-shaped bracket, a pin depending therefrom, said pin being journaled in said stand, said pivotal securing means including plates secured to said boom, and a stub shaft extending through said plates and the legs of said U-shaped member, and said resilient biasing means including a spring secured to said stand and said boom and stretched over one of said rollers.

JOHN A. BERKE.

REFERENCES CITED

The following references are of record in the file of this patent:

UNITED STATES PATENTS

| Number | Name | Date |
|---|---|---|
| 136,844 | Lyles | Mar. 18, 1873 |
| 617,228 | Damm | Jan. 3, 1889 |
| 806,278 | Nethery | Dec. 5, 1905 |
| 872,469 | Snell | Dec. 3, 1907 |
| 1,674,493 | Adams | June 19, 1928 |
| 1,680,831 | White | Aug. 14, 1928 |
| 1,940,701 | Shope | Dec. 25, 1933 |
| 2,090,136 | McKee | Aug. 17, 1937 |

FOREIGN PATENTS

| Number | Country | Date |
|---|---|---|
| 55,640 | Netherlands | Dec. 15, 1943 |